(12) United States Patent
Morishita et al.

(10) Patent No.: US 8,569,985 B2
(45) Date of Patent: Oct. 29, 2013

(54) WIPER CONTROL APPARATUS

(75) Inventors: Taiji Morishita, Kariya (JP); Yasuhiro Takabe, Higashihiroshima (JP); Hiroshi Miyazaki, Hatsukaichi (JP); Katsunori Tonomyo, Hiroshima (JP)

(73) Assignees: Denso Corporation, Kariya (JP); Mazda Motor Corporation, Hiroshima (JP)

( * ) Notice: Subject to any disclaimer, the term of this patent is extended or adjusted under 35 U.S.C. 154(b) by 232 days.

(21) Appl. No.: 13/227,768

(22) Filed: Sep. 8, 2011

(65) Prior Publication Data

US 2012/0062163 A1   Mar. 15, 2012

(30) Foreign Application Priority Data

Sep. 10, 2010   (JP) ................... 2010-202909

(51) Int. Cl.
*B60S 1/08*   (2006.01)
(52) U.S. Cl.
CPC .................... *B60S 1/0818* (2013.01)
USPC ........... 318/483; 318/445; 318/255; 318/456; 318/257; 318/258
(58) Field of Classification Search
CPC .................................. B60S 1/0818
USPC .................. 318/483, 445, 255–258
See application file for complete search history.

(56) References Cited

U.S. PATENT DOCUMENTS 7,009,356 B2 *   3/2006   Tanida ................ 318/483
7,466,097 B2 *   12/2008   Kokuryo et al. ............ 318/444
7,576,658 B2 *   8/2009   Ishikawa ................. 340/602

FOREIGN PATENT DOCUMENTS

JP   3033044   2/2000

* cited by examiner

*Primary Examiner* — Bentsu Ro
*Assistant Examiner* — David Luo
(74) *Attorney, Agent, or Firm* — Nixon & Vanderhye PC

(57) ABSTRACT

In a wiper control apparatus, a water drop detector outputs an output signal in accordance with water drops adhering to a windshield of a vehicle. When a traveling determination portion determines that the vehicle is traveling, a first level setting portion sets a sensitivity for detecting the output signal to a first sensitivity. When the traveling determination portion determines the vehicle is not traveling, a second level setting portion sets the sensitivity for detecting the output signal to a second sensitivity that is larger than the first sensitivity. A water drop adhesion determination portion determines that water drops adhere to the windshield when a determination waiting time elapses in a state where detection of the output signal continues. A driving control portion controls a wiper driving portion to drive the wiper when the water drop adhesion determination portion determines that water drops adhere to the windshield.

3 Claims, 5 Drawing Sheets

WIPER CONTROL APPARATUS

CROSS REFERENCE TO RELATED APPLICATIONS

The present application is based on and claims priority to Japanese Patent Applications No. 2010-202909 filed on Sep. 10, 2010, the contents of which are incorporated in their entirety herein by reference.

TECHNICAL FIELD

The present invention relates to a wiper control apparatus that controls driving of a wiper.

BACKGROUND

Conventionally, a wiper control apparatus includes a water drop detector for detecting water drops adhering to a windshield of a vehicle and controls driving of a wiper for wiping the windshield based on an output signal from the water drop detector. When the water drop detector is influenced by a factor other than water drops, for example, when an object other than water drops adheres to the windshield, the waterdrop detector may output a signal similarly to a case where water drops adhere. In such a case, the wiper control apparatus may determine that water drops adhere by error although water drops do not adhere, and the wiper may be driven by error. Japanese Patent No. 3,033,044 discloses that a sensitivity for detecting water drops is reduced so that a wiper do not operate by error due to a factor other than water drops.

However, in the case where the sensitivity for detecting water drops is reduced, the wiper may not be driven or driving of the wiper may be delayed, for example, when it starts raining or when rain is light.

SUMMARY

In view of the foregoing problems, it is an object of the present invention to provide a wiper control apparatus that can appropriately control driving of a wiper.

A wiper control apparatus according to an aspect of the present invention includes a wiper, a wiper driving portion, a water drop detector, a water drop adhesion determination portion, a driving control portion, a traveling determination portion, a first level setting portion, and a second level setting portion. The wiper wipes away water drops adhering to a windshield of a vehicle. The wiper driving portion drives the wiper. The water drop detector outputs an output signal in accordance with water drops adhering to the windshield. The water drop adhesion determination portion determines that water drops adhere to the windshield when a determination waiting time elapses in a state where detection of the output signal continues. The driving control portion controls the wiper driving portion to drive the wiper when the water drop adhesion determination portion determines that water drops adhere to the windshield. The traveling determination determines whether the vehicle is traveling. The first level setting portion sets a sensitivity for detecting the output signal to a first sensitivity when the traveling determination portion determines that the vehicle is traveling. The second level setting portion sets the sensitivity for detecting the output signal to a second sensitivity that is lower than the first sensitivity when the traveling determination portion determines that the vehicle is not traveling.

The wiper control apparatus can restrict erroneous operation of the wiper due to a factor other than water drops. Thus, the wiper control apparatus can appropriately control driving of the wiper.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE PREFERRED EMBODIMENTS (Exemplary Embodiment)

Figure 1:
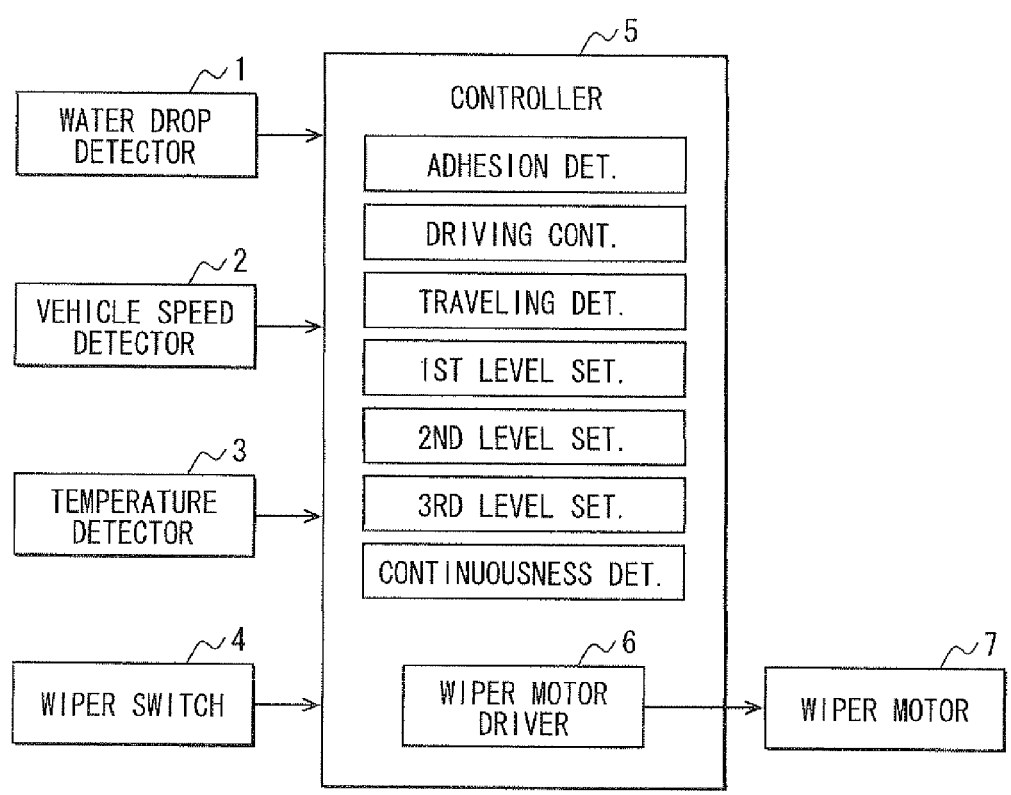
FIG. 1 is a block diagram showing a wiper control apparatus according to an exemplary embodiment.
Figure 2:
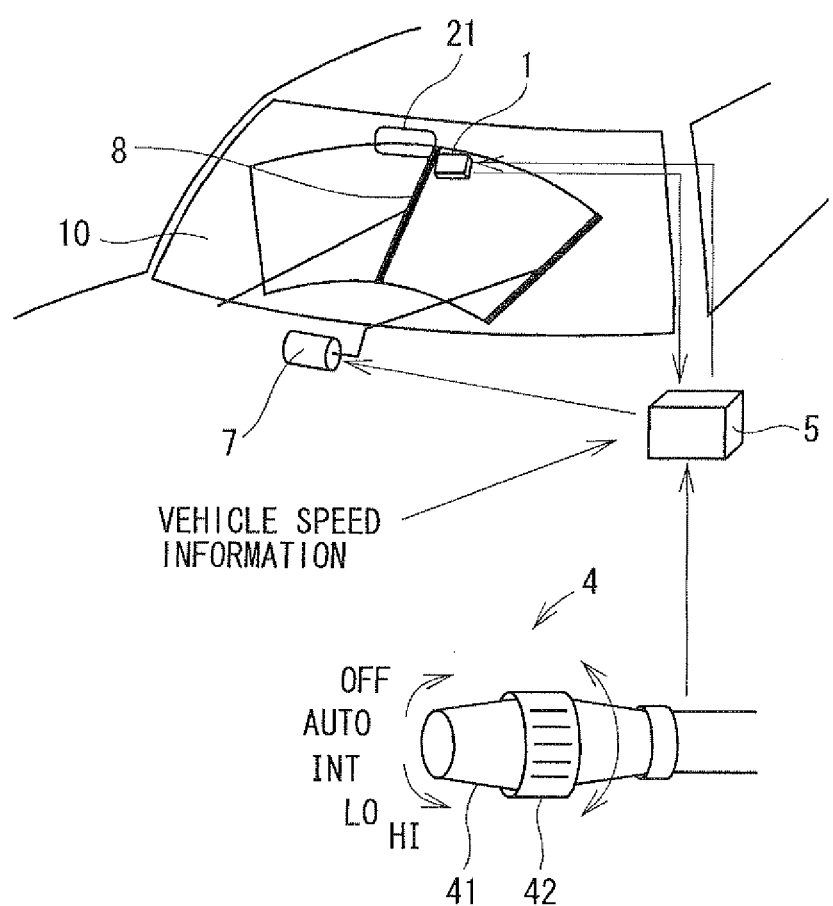
FIG. 2 is a diagram showing an exemplary state of disposing the wiper control apparatus to a vehicle.
Figure 3:
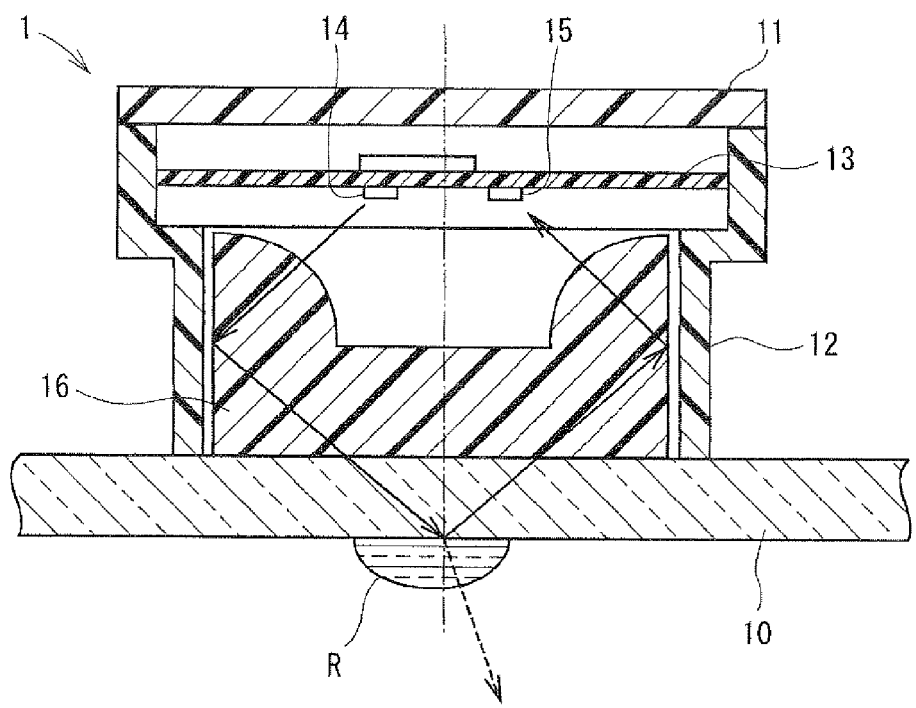
FIG. 3 is a cross-sectional view showing a water drop detector in the wiper control apparatus.

A wiper control apparatus according to an exemplary embodiment of the present invention will be described with reference to FIG. 1 to FIG. 3. The wire control device includes a water drop detector 1, a vehicle speed detector 2, a temperature detector 3, a wiper switch 4, a controller 5, and a wiper motor 7 as a wiper driving portion. The water drop detector 1 detects the amount of water drops such as raindrops adhering to a windshield 10 at front of a vehicle, The water drop detector 1 is disposed in an area close to view of a driver so as to avoid hiding the view. For example, as shown in FIG. 2, the water drop detector 1 is disposed on an upper portion of the windshield 10 in the vicinity of an inner mirror 21 and is located on an interior side of the windshield 10. The inner mirror 21 is fixed to the windshield 10, for example, with adhesive agent through an arm which is not shown. An angle of the inner mirror 21 can be manually adjusted.

In the present embodiment, the water drop detector 1 is an optical sensor. As shown in FIG. 3, the water drop detector 1 includes a cover 11, a base 12, a circuit substrate 13, a light emitting element 14, a light receiving element 15, and a prism 16. The water drop detector 1 guides emitted light from the light emitting element 14 to the windshield 10 through the prism 16 and guides reflected light that is reflected by the windshield 10 to the light receiving element 15 through the prism 16. In the present embodiment, the light emitting element 14 is an LED, and the light receiving element 15 is a photodiode. On the circuit substrate 13, the light emitting element 14, the light receiving element 15, and electronic parts configurating other processing circuit and output circuit are mounted. The base 12 and the cover 11 house the circuit substrate 13 and the prism 16 therein.

When water drops (shown by R in FIG. 3) do not adhere to an outer surface of the windshield 10, emitted light from the light emitting element 14 is substantially fully reflected by the windshield 10. When a waterdrop R adheres to the outer surface of the windshield 10, emitted light from the light emitting element 14 penetrates through the windshield 10 as shown by a dashed line in FIG. 3.

Figure 4:
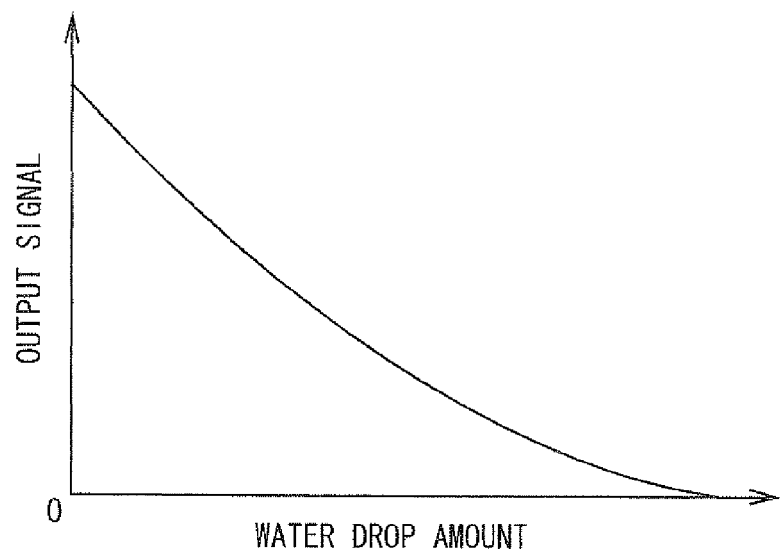
FIG. 4 is a graph showing a relationship between the amount of water drops and an output signal from the water drop detector.

Thus, when an adhesion ratio of water drops R in a reflection area of the windshield 10 increases, the amount of the emitted light penetrating through the windshield 10 increases. As a result, as shown in FIG. 4, the amount of light received by the light receiving element 15 decreases and an output signal output from the light receiving element 15 decreases with the increase in the adhesion ratio of water drops. The controller 5 acquires the output signal that changes in accordance with the adhesion ratio of water drops and detects the amount of water drops adhering to the windshield 10 based on the output signal. The output signal may be reduced by a factor other than water drops, such as operation of the inner mirror 21. Thus, in the present embodiment, the amount of water drops calculated from the output signal is called a water drop corresponding value.

The vehicle speed detector 2 detects a traveling speed of the vehicle and outputs a detection signal to the controller 5. The temperature detector 3 is disposed on the windshield 10 in the vicinity of the water drop detector 1. The temperature detector 3 detects a temperature of the windshield 10 and outputs a detection signal to the controller 5.

As shown in FIG. 2, the wiper switch 4 includes a mode switch 41. The mode switch 41 outputs a mode signal that indicates an operation mode of the wiper 8 to the controller 5. The operation mode is selected from an operation stop (OFF), an auto mode (AUTO), and a manual mode (INT, LO, HI). The wiper switch 4 also includes a sensitivity volume switch 42. The sensitivity volume switch 42 outputs a wiping level signal for changing a wiping level of the wiper 8 with respect to the amount of water drops when the auto mode is selected.

The controller 5 is a microcomputer. The controller 5 includes a central processing unit (CPU) that executes a control process and an arithmetic process, a read-only memory (ROM) that stores various programs and data, a storing device that includes a writable memory such as a random access memory (RAM), an input circuit, an output circuit, and a power source circuit. The controller 5 outputs a driving signal from a wiper motor driver 6 to the wiper motor 7 so as to drive the wiper 8 based on the output signals from the water drop detector 1, the vehicle speed detector 2, the temperature detector 3, and the wiper switch 4. Accordingly, the wiper motor 7 is driven and the wiper 8 starts wiping operation. In the example shown in FIG. 1, the controller 5 includes the wiper motor driver 6. However, the controller 5 and the wiper motor driver 6 may also be provided independently from each other.

When the inner mirror 21 is operated to adjust an angle of the inner mirror 21, external force is transmitted to the windshield 10 through the arm. When the windshield 10 is warped by the external force, a part of the emitted light from the light emitting element 14 is not received by the light receiving element 15. When the amount of light received by the light receiving element 15 is reduced, the signal strength of the output signal is reduced although that water drops do not adhere to the windshield 10. As a result, erroneous determination that the water drops adhere to the windshield 10 may be caused, and the wiper 8 may be operated by error. The inner mirror 21 is generally operated while the vehicle stops, for example, at vehicle start-up. Even when the inner mirror 21 is operated while the vehicle is traveling, only fine adjustment of the inner mirror 21 is performed, and a time required for operating the inner mirror 21 is probably about 0.2 to 0.5 seconds.

Figure 5:
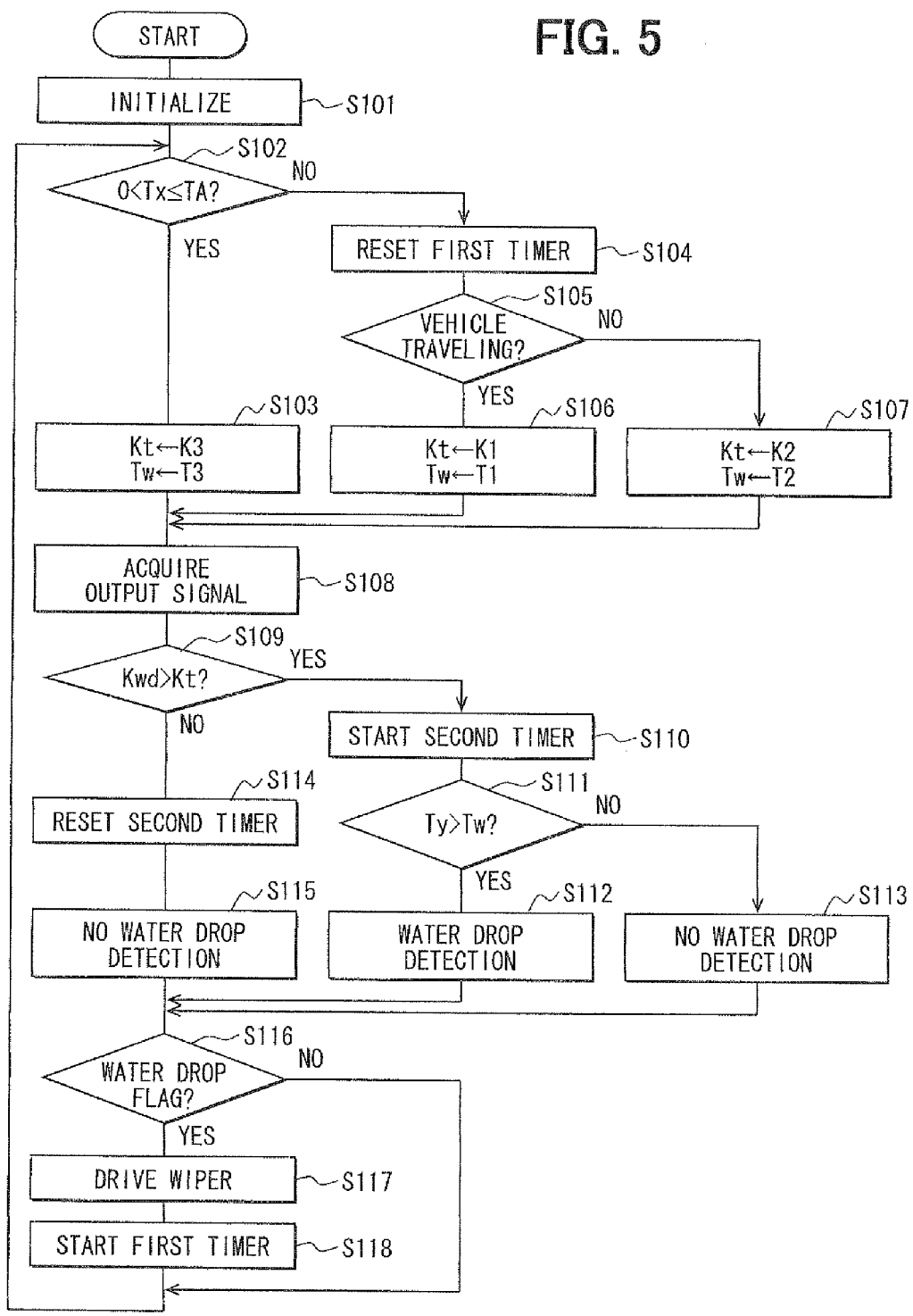
FIG. 5 is a flowchart showing a wire control process performed by a controller.

Thus, the wiper control apparatus according to the present embodiment executes a wiper control process, for example, as shown in FIG. 5 so that the wiper 8 does not operate by error due to a factor other than water drops, such as operation of the inner mirror 21. The wiper control process is executed by the controller 5 when the auto mode is selected with the wiper switch 4.

At S101, the controller 5 executes an initialization process in which various flags are reset. At S102, the controller 5 determines whether the wiper 8 continues wiping operation. The controller 5 measures an elapsed time Tx from when the wiper 8 starts to operate with a first timer. When the elapsed time Tx is within a predetermined time TA, the controller 5 determines that wiper 8 continues wiping operation, which corresponds to "YES" at S102. When the elapsed time Tx is longer than the predetermined time TA, the controller 5 determines that the wiper 8 does not continue wiping operation, which corresponds to "NO" at S102. In addition, also when the first timer is reset and the first timer does not measure the elapsed time Tx, the controller 5 determines "NO" at S102. "The wiper 8 continues wiping operation" is not limited to a case where the wiper 8 consecutively operates without interruption and includes a case where the wiper 8 performs wiping operation at intervals shorter than the predetermined time TA. When the controller 5 determines that the wiper 8 does not continue wiping operation, which corresponds to "NO" at S102, that is, when Tx=0 or Tx>TA, the process proceeds to S104. When the controller 5 determines that the wiper 8 continues wiping operation, which corresponds to "YES" at S102, that is, when 0<Tx≤TA, the process proceeds to S103. When the determination result at S102 is "YES," there is a high possibility that it is raining. When the determination result at S102 is "NO," there is a high possibility that it is not raining.

At S103, the controller 5 sets a detection threshold value Kt for detecting the output signal from the water drop detector 1 to a third threshold value value K3. In addition, the controller 5 sets a determination waiting time Tw to a third time T3. The determination waiting time Tw is a time from when the output signal is detected till when the controller 5 determines that water drops adhere to the windshield 10. Then, the process proceeds to S108.

At S104, when the first timer is measuring the elapsed time Tx, the first timer is reset. At S105, the controller 5 determines whether the vehicle is traveling based on the output signal from the vehicle speed detector 2. When the controller 5 determines that the vehicle is traveling, which corresponds to "YES" at S105, the process proceeds to S106. When the controller 5 determines that the vehicle is not traveling, which corresponds to "NO" at S105, the process proceeds to S107.

At S106, the controller 5 sets the detection threshold value Kt for detecting the output signal from the water drop detector 1 to a first threshold value value K1 and sets the determination waiting time Tw to a first time T1, Then, the process proceeds to S108. At S107, the controller 5 sets the detection threshold value Kt for detecting the output signal from the water drop detector 1 to a second threshold value K2 and sets the determination waiting time Tw to a second time T2. Then, the process proceeds to S108.

At S108, the controller 5 acquires the output signal from the water drop detector 1 and calculates the water drop corresponding value Kwd. At S109, the controller 5 determines whether the water drop corresponding value Kwd is greater than the detection threshold value Kt. The detection threshold value Kt has a value set at S103, S106, or S107. If the controller 5 determines that the water drop corresponding value Kwd is less than or equal to the detection threshold value Kt, which corresponds to "NO" at S109, the process proceeds to S114. If the controller 5 determines that the water drop corresponding value Kwd is greater than the detection threshold value Kt, which corresponds to "YES" at S109, the process proceeds to S110.

At S110, the controller 5 starts to measure a detection elapsed time Ty with a second timer. The detection elapsed time Ty is a time from when the water drop corresponding value Kwd exceeds the detection threshold value Kt. If the detection elapsed time Ty is being measured, the measurement is continued. At S111, the controller 5 determines whether the detection elapsed time Ty exceeds the determination waiting time Tw. The determination waiting time Tw has a value set at S103, S106, or S107. If the controller 5 determines that the detection elapsed time Ty is within the determination waiting time Tw, which corresponds to "NO" at S111, the process proceeds to S113. If the controller 5 determines that the detection elapsed time Ty exceeds the determination waiting time Tw, which corresponds to "YES" at S111, the process proceeds to S112.

At S112, the controller 5 determines that water drops adhere to the windshield 10 and sets a water drop flag. At S113, the controller 5 determines that water drops do not adhere to the windshield 10. At S114, if the second timer is measuring the detection elapsed time Ty, the second timer is reset. Even when it is raining, because the water drop corresponding value Kwd becomes less than or equal to the detection threshold value Kt just after the wiping operation of the wiper 8, the controller 5 determines "NO" at S109 and the second timer is reset at S114. At S115, the controller 5 determines that water drops do not adhere to the windshield 10.

At S116, the controller 5 determines whether the water drop flag is set. When the water drop flag is not set, which corresponds to "NO" at S116, the process returns to S102. When the water drop flag is set, which corresponds to "YES" at S116, the process proceeds to S117. At S117, the controller 5 outputs the driving signal from the wiper motor driver 6 to drive the wiper motor 7. When the wiper motor 7 is driven, the wiper 8 starts wiping operation to wipe away water drops adhering to the windshield 10. Then, the water drop flag is reset.

At S118, the controller 5 starts to measure the elapsed time Tx from when the wiping operation of the wiper 8 ends with the first timer, and the process returns to S102. If the first timer is measuring the elapsed time Tx, the first timer is once reset and starts to measure the elapsed time Tx from zero. Although the first timer measures a time from when wiping operation of the wiper 8 ends in the present embodiment, the first timer may also measure a time from when the wiper 8 starts wiping operation.

The detection threshold value Kt and the determination waiting time Tw will be described below. In the present embodiment, the controller 5 detects the output signal when the water drop corresponding value Kwd is greater than the detection threshold value Kt. That is, the detection threshold value Kt corresponds to sensitivity for detecting the output signal. In addition, the first threshold value K1 corresponds to a first sensitivity, the second threshold value K2 corresponds to a second sensitivity, and the third threshold value K3 corresponds to a third sensitivity. When the detection threshold value Kt is large, the output signal is not detected unless the water drop corresponding value Kwd is also large. Thus, it can be said that the sensitivity for detecting the output signal is low. In contrast, when the detection threshold value Kt is small, the output signal is detected even when the water drop corresponding value Kwd is small. Thus, it can be said that the sensitivity for detecting the output signal is high. In the present embodiment, the third threshold value K3 is the smallest, the first threshold value K1 is the second smallest, and the second threshold value K2 is the largest. That is, K3<K1<K2. In other words, the sensitivity set at S103 while the wiper 8 is driven is the highest, the sensitivity set at S106 while the vehicle is traveling without driving the wiper 8 is the second highest, and the sensitivity set at S107 while the vehicle stops without driving the wiper 8 is the lowest. The second threshold value K2 is larger than the water drop corresponding value Kwd detected at a time when the inner mirror 21 is operated.

When the output signal is detected with the sensitivity set at S103, S106 or S107, and the detection is continued for the determination waiting time Tw, that is, when the determination waiting time Tw elapses in a state where the water drop corresponding value Kwd is greater than the detection threshold value Kt, the controller 5 determines that water drops adhere to the windshield 10. In the present embodiment, the third time T2 set at S103 while the wiper 8 is driven is the shortest, the second time T2 set at S107 while the vehicle stops without driving the wiper 8 is the second shortest, and the first time T1 set at S106 while the vehicle is traveling without driving the wiper 8 is equal to or longer than the second time T2. That is T3<T2≤T1. However, when the determination waiting time Tw is too long, wiping operation of the wiper 8 may be delayed, for example, when rain is heavy. Thus, even the first time T1, which is the longest, may be set to 0.5 seconds or shorter.

Figure 6A:
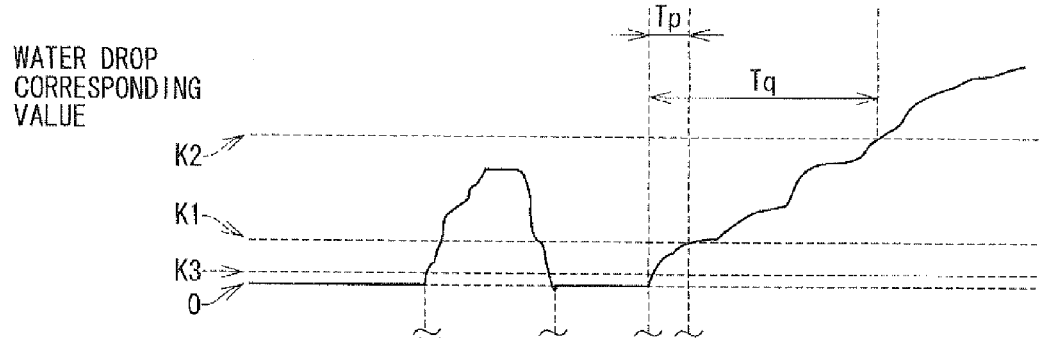
FIG. 6A is a timing diagram showing a water drop corresponding value and FIG. 6B is a timing diagram showing a determination result of whether water drops adhere to a windshield.
Figure 6B:
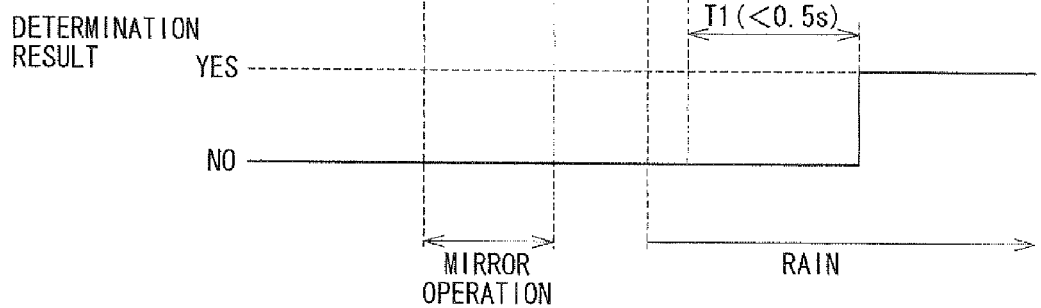

An example of determining water drop adhesion to the windshield 10 will be described with reference to FIG. 6A and FIG. 6B. FIG. 6A is a timing diagram showing the water drop corresponding value Kwd, and FIG. 6B is a timing diagram showing a determination result of whether water drops adhere to the windshield 10. At the starting point of the timing diagrams, the wiper 8 does not continue wiping operation, which corresponds to "NO" at S102.

When the windshield 10 warps due to operation of the inner mirror 21, the amount of light received by the light receiving element 15 is reduced. Accordingly, as shown in FIG. 6A, during the operation of the inner mirror 21, the water drop corresponding amount Kwd is temporarily not zero. However, after the operation of the inner mirror 21 ends, the water drop corresponding amount Kwd returns to zero. When vehicle is traveling, which corresponds to "YES" at S105, and an operation time of the inner mirror 21 is within the first time T1, which corresponds to "NO" at S111, the controller 5 determines that water drops do not adhere to the windshield 10, which corresponds to S113, and the controller 5 does not drive the wiper 8. Accordingly, the wiper 8 is less likely to operate by error due to the operation of the inner mirror 21. In other words, when the determination waiting time Tw does not elapse in a state where the detection of the output signal continues, the controller 5 determines that water drops do not adhere to the windshield 10 and there is a factor other than water drops.

When it is raining and water drops adhere to the windshield 10, the water drop corresponding value Kwd is maintained without decreasing until the wiper 8 wipes away water drops, and the water drop corresponding value Kwd increases with the amount of water drops adhering to the windshield 10. When the vehicle is traveling, which corresponds to "YES" at S105, and a state where the water drop corresponding amount is greater than the first threshold value K1 continues for a time longer than the first time T1, which corresponds to "YES" at S109 and "YES" at Sill, the controller 5 determines that water drops adhere to the windshield 10, which corresponds to "YES" at S112, and the controller 5 drives the wiper 8 at S117.

Although it is not shown in FIG. 6A, when the wiper 8 is driven, the water drop corresponding value Kwd once returns to zero. Then, when the elapsed time Tx from the driving of the wiper 8 is within the predetermined time TA, which corresponds to "YES" at S102, the threshold value Kt is set to the third threshold value K3 and the determination waiting time Tw is set to the third time T3 at S103. Thus, when a state where the water drop corresponding amount Kwd is greater than the third threshold value K3 continues for a time longer than the third time T3, which corresponds to "YES" at S109 and "YES" at Sill, the controller 5 determines that water drops adhere to the windshield 10 at S112, and the controller 5 drives the wiper 8 at S117. Because the third threshold value K3 is the smallest and the third time T3 is the shortest, while the wiper 8 is driven, that is, while it is raining, the driving of the wiper 8 can be appropriately continued.

A time required for operating the inner mirror 21 while the vehicle stops varies widely depending on, for example, characteristics of a driver. Thus, in the present embodiment, when the vehicle stops, which corresponds to "NO" at S105, the detection threshold value Kt is set to the second threshold value K2 that is sufficiently larger than the water drop corresponding value Kwd at a time when the inner mirror 21 is operated. Accordingly, the wiper 8 is less likely to operate by error due to operation of the inner mirror 21. By increasing the detection threshold value Kt, a time till when the water drop corresponding value Kwd exceeds the detection threshold value Kt increases. In the example shown in FIG. 6A, the water drop corresponding value Kwd exceeds the first threshold value K1 at time Tp from when it starts raining. In a case where the detection threshold value Kt is set to the second threshold value K2 that is larger than the first threshold value K1, the water drop corresponding value Kwd exceeds the second threshold value K2 at time Tq from when it starts raining, and the time Tq is longer than the time Tp. Especially when rain is light, because an increase ratio of the water drop corresponding value Kwd is small, a time till when the water drop corresponding value Kwd exceeds the second threshold value K2 is long. When the time till when the water drop corresponding value Kwd exceeds the second threshold value K2 is long, the wiper 8 starts wiping operation later than when the vehicle is traveling. However, because the vehicle stops, the delay of the wiping operation does not cause problem on driving the vehicle. While the vehicle stops, because the detection threshold value Kt is set to the second threshold value K2 larger than the first threshold value K1, the time required for detecting the water drop corresponding value Kwd increases. Thus, the second time T2 as the determination waiting time Tw from when the water drop corresponding value Kwd is detected till when the controller 5 determines that water drops adhere to the windshield 10 is set to be shorter than the first time T1. Accordingly, the controller 5 can drive the wiper 8 promptly after the water drop corresponding value Kwd exceeds the second threshold value.

As described above, the water drop detector 1 outputs the output signal in accordance with the water drops adhering to the windshield 10. The controller 5 determines whether the vehicle is traveling. If the controller 5 determines that the vehicle is traveling, which corresponds to "YES" at S105, the detection threshold value Kt for detecting the output signal is set to the first threshold value K1, and the determination waiting time Tw from when the water drop corresponding value Kwd exceeds the first threshold value K1 till when the controller 5 determines that water drops adhere to the windshield 10 is set to the first time T1 at S106. If the controller 5 determines that the vehicle is not traveling, which corresponds to "NO" at S105, the detection threshold value Kt for detecting the output signal is set to the second threshold value K2 that is larger than the first threshold value, and the determination waiting time Tw from when the water drop corresponding value Kwd exceeds the second threshold value K2 till when the controller 5 determines that water drops adhere to the windshield 10 is set to the second time T2 that is equal to or shorter than the first time T1 at S107. Then, when the determination waiting time Tw elapses in the state where the water drop corresponding value Kwd is greater than the detection threshold value Kt, which corresponds to "YES" at S109 and "YES" at S111, the controller 5 determines that water drops adhere to the windshield 10 at S112, and the controller 5 controls the wiper motor 7 to drive the wiper 8 at S117.

In the present embodiment, when the vehicle is traveling, the sensitivity for detecting the output signal is increased compared with when the vehicle stops, so that the wiper 8 certainly operates even when it starts raining or when rain is light, and the determination waiting time Tw is increased compared with when the vehicle stops. Thus, the wiper 8 is less likely to operate by error due to a factor other than water drops, such as operation of the inner mirror 21. On the other hand, when the vehicle stops, the sensitivity for detecting the output signal is decreased compared with when the vehicle is traveling so that the wiper 8 is less likely to operate by error due to a factor other than water drops, such operation of the inner mirror 21. Accordingly, the driving of the wiper 8 can be appropriately controlled.

When the controller 5 determines that the wiper 8 continues wiping operation, which corresponds to "YES" at S102, the detection threshold value Kt for detecting the output signal is set to the third threshold value K3 that is smaller than the first threshold value K1, and the determination waiting time Tw from when the water drop corresponding value Kwd exceeds the third threshold value K3 till when the controller 5 determines that water drops adhere to the windshield 10 is set to the third time T3 that is shorter than the second time T2 at S103. Accordingly, when the wiper 8 continues wiping operation, that is, when rain continues, the detection threshold value Kt is reduced to increase the sensitivity for detecting the output signal and the determination waiting time Kwd is reduced, so that the wiper 8 can be appropriately driven when it rains. In other words, in the present embodiment, only at the start of wiping operation, the sensitivity is decreased or the determination waiting time Tw is increased so that the wiper 8 does not operate by error due to a factor other than water drops, such as operation of the inner mirror 21.

In the present embodiment, the controller 5 includes a water drop adhesion determination portion (ADHESION DET.), a driving control portion (DRIVING CONT.) a traveling determination portion (TRAVELING DET.), a first level setting portion (1ST LEVEL SET.), a second level setting portion (2ND LEVEL SET.), a third level setting portion (3RD LEVEL SET.), and a continuousness determination portion (CONTINUOUSNESS DET). The water drop adhesion determination portion executes the process at S112, the driving control portion executes the process at S117, the traveling determination portion executes the process at S105, the first level setting portion executes the process at S106, the second level setting portion executes the process at S107, the third level setting portion executes the process at S103, and the continuousness determination portion executes the process at S102.

(Other Embodiments)

In the above-described embodiment, the controller 5 determines whether water drops adhere to the windshield 10 by comparing the water drop corresponding value Kwd and the detection threshold value Kt. The controller 5 may also determine whether water drops adhere based on a decrease amount of the output signal. The controller 5 may also determine whether water drops adhere based on the output signal. In the present case, the controller 5 determines that water drops adhere to the windshield 10 when the determination waiting time Tw elapses in a state where the output signal is lower than the detection threshold value. In the present case, the sensitivity is high when the detection threshold value is large, and the sensitivity is low when the detection threshold value is small. Thus, the third threshold value is the largest, the first threshold value is the second largest, and the second threshold value is the smallest.

In the above-described embodiment, when the elapsed time Tx from the driving of the wiper 8 is within the predetermined time TA, which corresponds to "YES" at S102, the detection threshold value Kt is set to the third threshold value K3, and the determination waiting time Tw is set to the third time T3 at S103. The processes at S102 and S103 may be omitted.

In the above-described embodiment, the wiper control apparatus is configured to control the wiper for wiping away water drops on a front windshield. The wiper control apparatus may also be configured to control a wiper disposed at any position of a vehicle, such as a rear wiper for wiping away water drops on a rear windshield.

In the above-described embodiment, operation of the inner mirror 21 is described as an example of a factor other than water drops that causes erroneous determination that water drops adhere to the windshield 10. The factor causing the erroneous determination is not limited to the operation of the inner mirror 21.

The present invention is not limited to the above-described embodiments and various changes and modifications can be performed within the scope of the present invention.

What is claimed is:

1. A wiper control apparatus comprising:
    a wiper configured to wipe away water drops adhering to a windshield of a vehicle;
    a wiper driving portion configured to drive the wiper;
    a water drop detector configured to output an output signal in accordance with water drops adhering to the windshield;
    a water drop adhesion determination portion configured to determine that water drops adhere to the windshield when a determination waiting time elapses in a state where detection of the output signal continues;
    a driving control portion configured to control the wiper driving portion to drive the wiper when the water drop adhesion determination portion determines that water drops adhere to the windshield;
    a traveling determination portion configured to determine whether the vehicle is traveling;
    a first level setting portion configured to set a sensitivity for detecting the output signal to a first sensitivity when the traveling determination portion determines that the vehicle is traveling; and
    a second level setting portion configured to set the sensitivity for detecting the output signal to a second sensitivity that is lower than the first sensitivity, when the traveling determination portion determines that the vehicle is not traveling;
    wherein the first level setting portion is configured to set the determination waiting time from when the output signal is detected with the first sensitivity till when the water drop adhesion determination portion determines that water drops adhere to the windshield to a first time; and
    wherein the second level setting portion is configured to set the determination waiting time from when the output signal is detected with the second sensitivity till when the water drop adhesion determination portion determines that water drops adhere to the windshield to a second time that is equal to or shorter than the first time.

2. The wiper control apparatus according to claim 1, further comprising a continuousness determination portion configured to determine whether the wiper continues wiping operation, and
    a third level setting portion configured to set the sensitivity for detecting the output signal to a third sensitivity that is higher than the first sensitivity when the continuousness determination portion determines that the wiper continues wiping operation.

3. The wiper control apparatus according to claim 2,
    wherein the third level setting portion is configured to set the determination waiting time from when the output signal is detected with the third sensitivity till when the water drop adhesion determination portion determines that water drops adhere to the windshield to a third time that is shorter than the second time when the continuousness determination portion determines that the wiper continues wiping operation.

* * * * *